(12) United States Patent
Geiken (10) Patent No.: US 9,157,577 B2
(45) Date of Patent: Oct. 13, 2015

(54) DOOR LOCK

(75) Inventor: Peter Geiken, Emden (DE)

(73) Assignee: Wobben Properties GmbH, Aurich (DE)

( * ) Notice: Subject to any disclaimer, the term of this patent is extended or adjusted under 35 U.S.C. 154(b) by 191 days.

(21) Appl. No.: 13/883,276

(22) PCT Filed: Nov. 2, 2011

(86) PCT No.: PCT/EP2011/069242
§ 371 (c)(1),
(2), (4) Date: Jun. 25, 2013

(87) PCT Pub. No.: WO2012/059516
PCT Pub. Date: May 10, 2012

(65) Prior Publication Data
US 2013/0264167 A1   Oct. 10, 2013

(30) Foreign Application Priority Data

Nov. 4, 2010   (DE) .......................... 10 2010 043 436

(51) Int. Cl.
*F16P 3/08*   (2006.01)
*F03D 11/00*   (2006.01)
*F03D 1/06*   (2006.01)

(52) U.S. Cl.
CPC ... *F16P 3/08* (2013.01); *F03D 1/06* (2013.01); *F03D 11/00* (2013.01); *F05B 2240/14* (2013.01); *Y02E 10/721* (2013.01); *Y02E 10/722* (2013.01)

(58) Field of Classification Search
CPC .......................................................... F16P 3/10
See application file for complete search history.

(56) References Cited

U.S. PATENT DOCUMENTS

| | | | |
|---|---|---|---|
| 4,611,703 A | 9/1986 | Bliss | |
| 5,131,515 A * | 7/1992 | Scamardo | 192/135 |
| 7,220,104 B2 | 5/2007 | Zheng et al. | |
| 7,431,567 B1 | 10/2008 | Bevington et al. | |
| 2007/0075548 A1* | 4/2007 | Bagepalli et al. | 290/55 |
| 2008/0245756 A1* | 10/2008 | Dehlsen et al. | 212/224 |
| 2010/0232978 A1 | 9/2010 | Nielsen et al. | |
| 2011/0316278 A1* | 12/2011 | Siegfriedsen | 290/44 |

FOREIGN PATENT DOCUMENTS

| | | |
|---|---|---|
| DE | 29 28 507 A1 | 1/1981 |
| EP | 1 371 845 A2 | 12/2003 |
| KR | 10-2010-0090499 A | 8/2010 |
| RU | 2 309 290 C1 | 10/2007 |
| RU | 2 382 897 C2 | 2/2010 |
| TW | 117174 | 8/1989 |

* cited by examiner

*Primary Examiner* — Richard Lorence
(74) *Attorney, Agent, or Firm* — Seed IP Law Group PLLC (57) ABSTRACT

The invention relates to a device for controlling the locking of the opening of a door preferably located between the stationary part and the rotary part of a wind power plant. According to the invention, means are provided for immobilizing or stopping the rotary part, and the door between the rotary part and the stationary part of the wind power plant comprises a lock that allows unlocking and then if required opening the door when the immobilizing or stopping means have immobilized or stopped the rotary part of the wind power plant.

14 Claims, 16 Drawing Sheets

DOOR LOCK

BACKGROUND

1. Technical Field

Wind power installations regularly have a pylon, a machine housing, a generator, and a rotor, in which the rotor carries the rotor blades of the wind power installation. In that case the rotor is a rotating part of the installation and the rotor generally also has a hub in addition to the rotor blades and is coupled to the rotor member or rotating part of the generator.

2. Description of the Related Art

Such wind power installations are typically subjected to maintenance and for that purpose maintenance personnel go into the interior of the wind power installation. That is without any problem when the maintenance personnel go into the part of the wind power installation in which the stationary parts of the wind power installation are disposed, such as for example, in the pylon or in the machine housing above the pylon where the stator of the generator is disposed together with the corresponding control devices and also switch cabinets, rectifiers and the like.

If however the maintenance personnel have to go into the rotating part of the wind power installation, the rotating part of the wind power installation is usually braked and/or stopped so that the maintenance personnel can go into that part of the wind power installation to be able to carry out maintenance or service operations there.

A state of the art reference is directed generally to the following document: US No 2010/0232978 A1.

BRIEF SUMMARY

According to an embodiment of the invention there is provided that arranged between the rotating and the stationary parts of the wind power installation is a door or an access which is closed and locked until the rotating part of the wind power installation is stopped. The rotating part of the wind power installation therefore has to be brought to a halt first before unlocking or opening of the door.

That also ensures that the maintenance and service personnel who go into the region with the rotating parts of the wind power installation for maintenance and service operations can safely reach that region and can there also safely carry out other maintenance and service operations and, after those maintenance and service operations are concluded and after the door is closed and locked, the fixing devices can be moved into their starting position again in order in that way to release the rotating part of the wind power installation again and to permit operation of the wind power installation.

BRIEF DESCRIPTION OF THE SEVERAL VIEWS OF THE DRAWINGS

The invention is described hereinafter by means of an example illustrated in the drawing.

DETAILED DESCRIPTION

Figure 1:
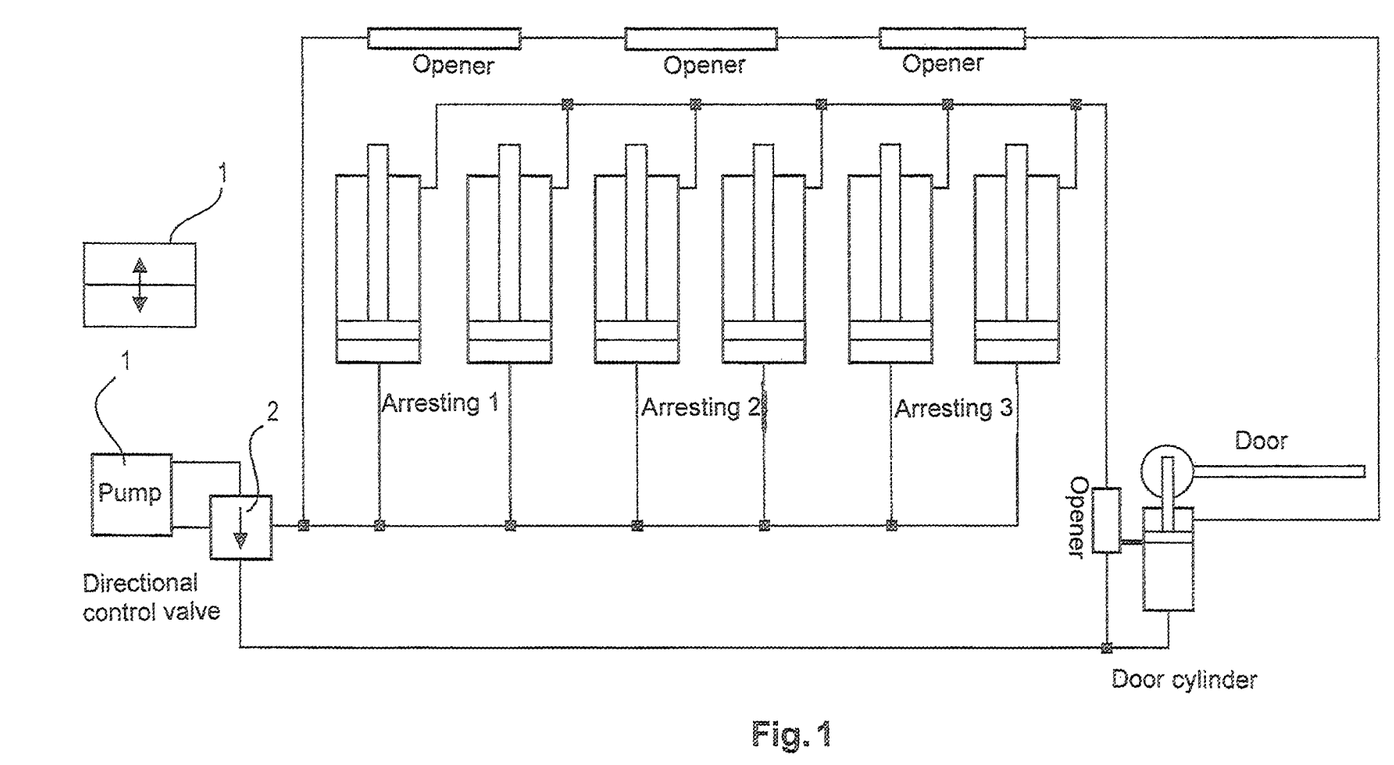
FIGS. 1 to 11 show a hydraulic system which controls on the one hand the fixing devices like also on the other hand the locking means for the door.

The structure of the apparatus according to the invention in FIG. 1 comprises a pump 1 by means of which hydraulic fluid, for example water, oil, or the like, can be pumped. The pump can be driven by machine, such as an electronic device, but it is also possible for the pump to be driven manually, namely by the service personnel themselves. Arranged downstream of the pump is a directional control valve 2 which is displaceable into two positions.

Figure 2:
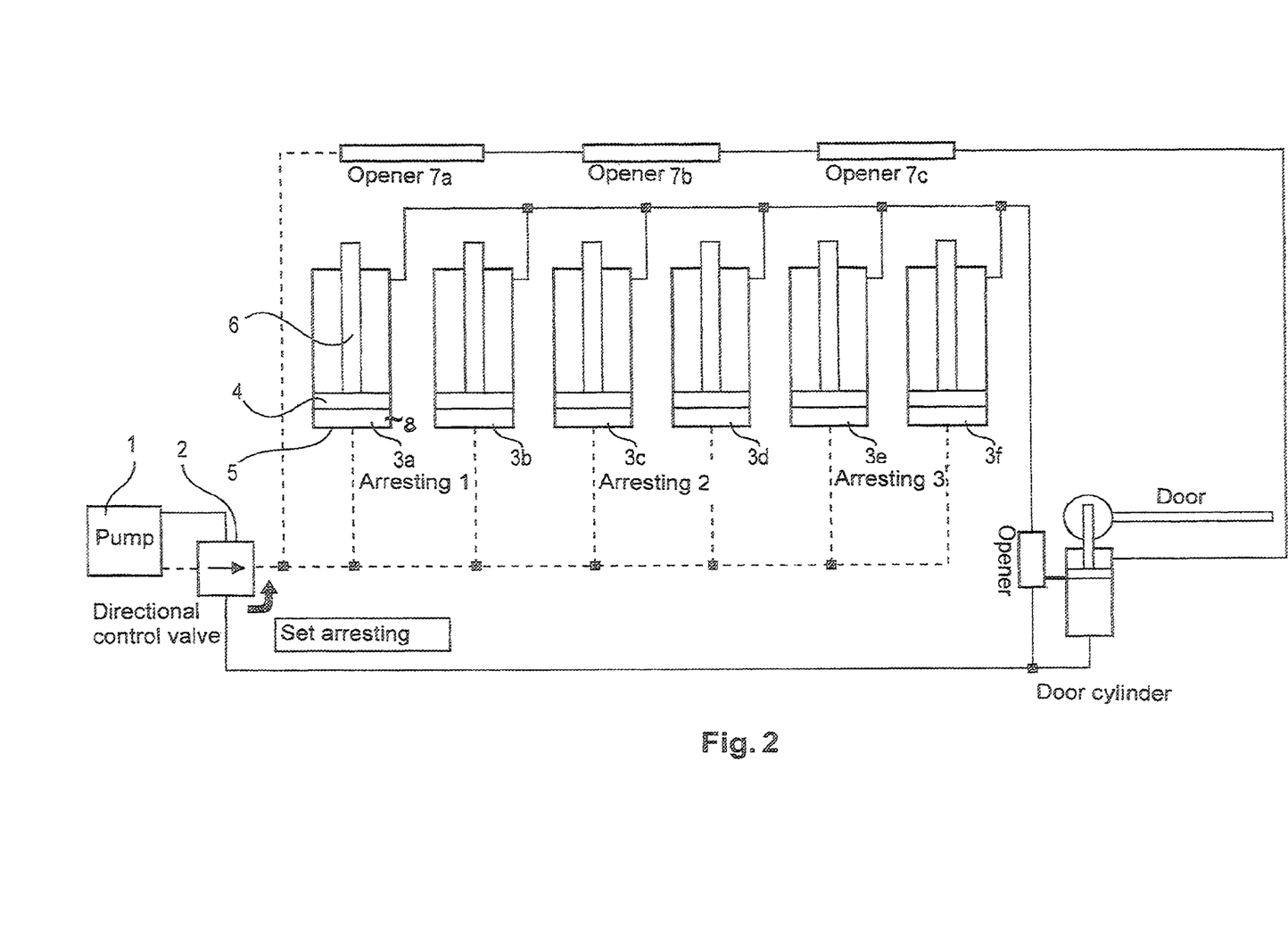

FIG. 2 shows how the directional control valve is set to provide for fixing, that is to say arresting or stopping, the rotating part of the wind power installation.

In the illustrated example an arresting device comprises six individual fixing devices 3a, 3b, 3c, 3d, 3e, 3f, wherein each two fixing devices form a respective pair. The fixing devices 3 themselves comprise in this case pistons 4 which are displaceable within a cylinder 5 and in which a piston rod 6 is ultimately the part which, when it is moved into the arresting position, co-operates with a valve 7 which is closed as long as the piston 4 is not yet entirely extended and thus the rotor of the wind power installation is not yet securely fixed.

In the drawing, the lines into which the hydraulic fluid flows from the pump are shown in broken line. A slightly increased pressure prevails under some circumstances in those lines while a lower pressure prevails in the lines which are not shown in broken line and through which hydraulic fluid flows back to the pump 1.

The illustrated valves 7a, 7b, 7c (openers) are in that case preferably control valves, that is to say valves which only allow the through-flow of hydraulic fluid in one direction when the valve is in a given condition.

Figure 3:
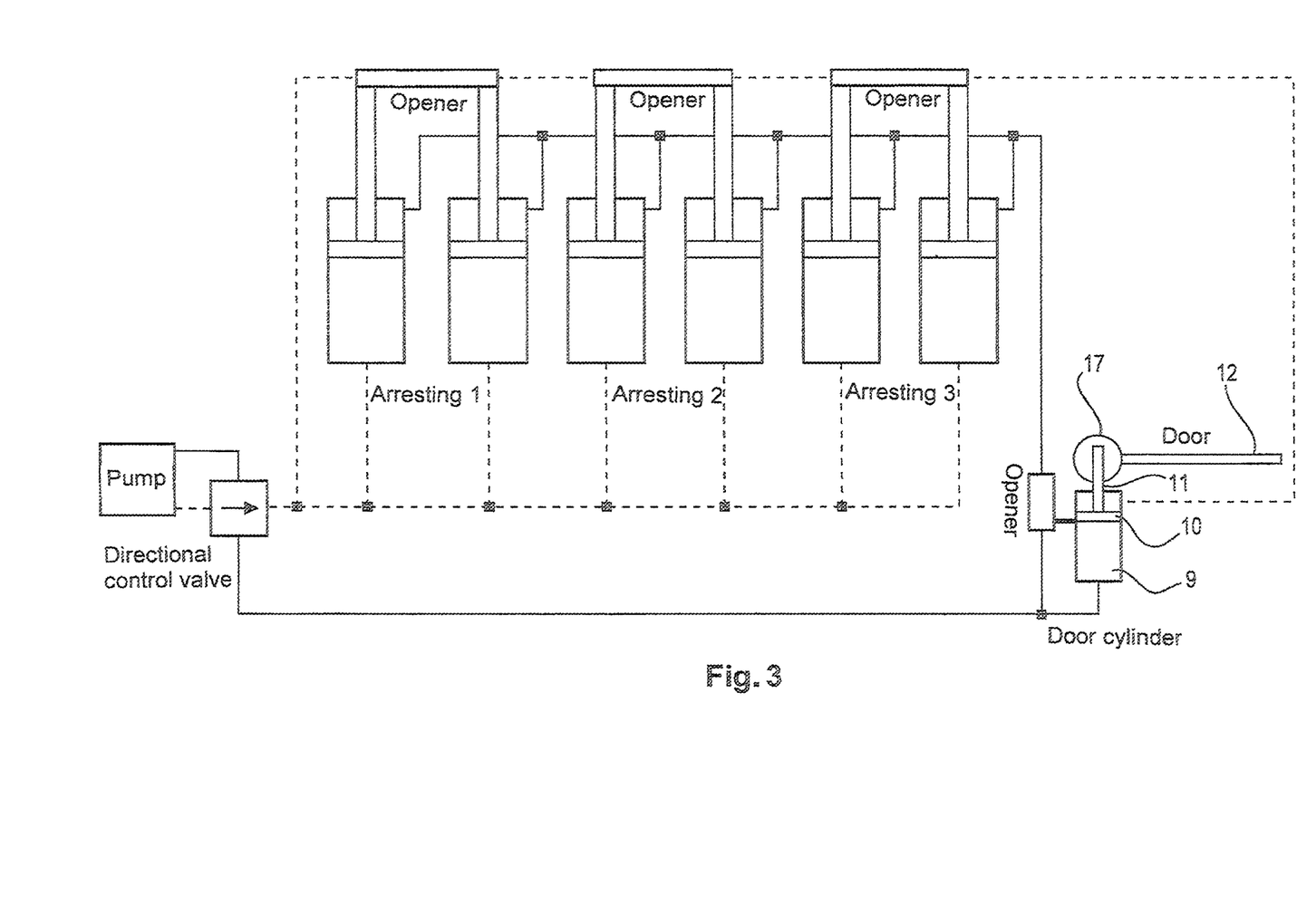

In FIG. 2 the valves are still closed. It will be seen from FIG. 2 that firstly the hydraulic fluid passes into the part 8 of the cylinder 5, the volume of which is determined by the piston 4 of the arresting device. The pistons 4 are displaced by hydraulic fluid being pumped into that part 8 of the cylinders 5 and thus the piston rods 6 are also advanced, more specifically until see FIG. 3 the piston rods switch or open the valves 7 so that, as the pistons 4 can no longer be further advanced, hydraulic fluid can flow through the valves 7 as far as a further cylinder 9 which also accommodates a piston 10 with piston rod 11 and by which a door 12 is fixedly locked and is not to be opened, insofar as the piston rod 11 passes through a part of the door, for example a rotary hinge 17.

Figure 4:
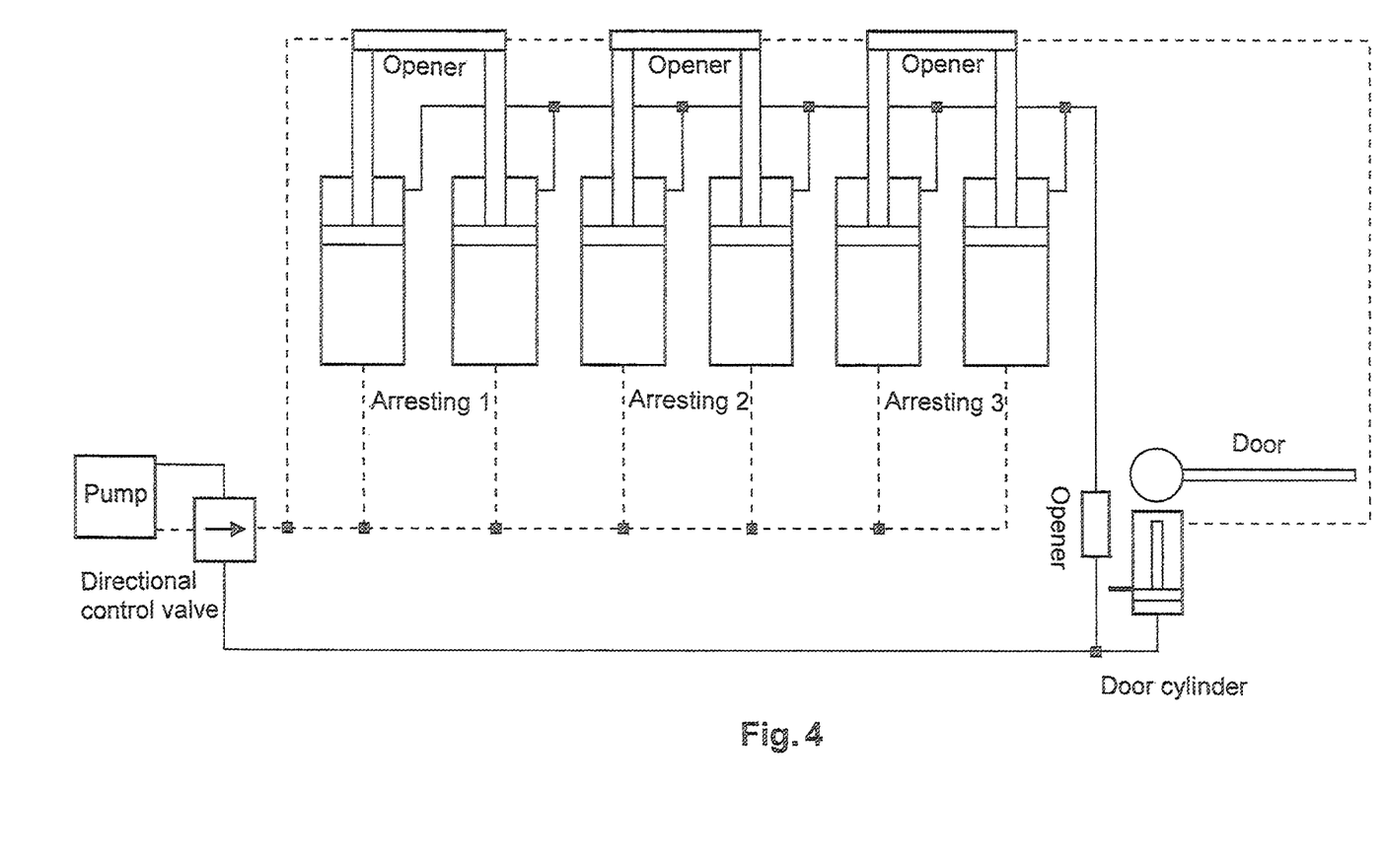

Hydraulic fluid now passes into the part of the cylinder and in so doing displaces the piston together with the piston rod back (downwardly in the drawing) and thus releases the locking of the door (FIG. 4).

Figure 5:
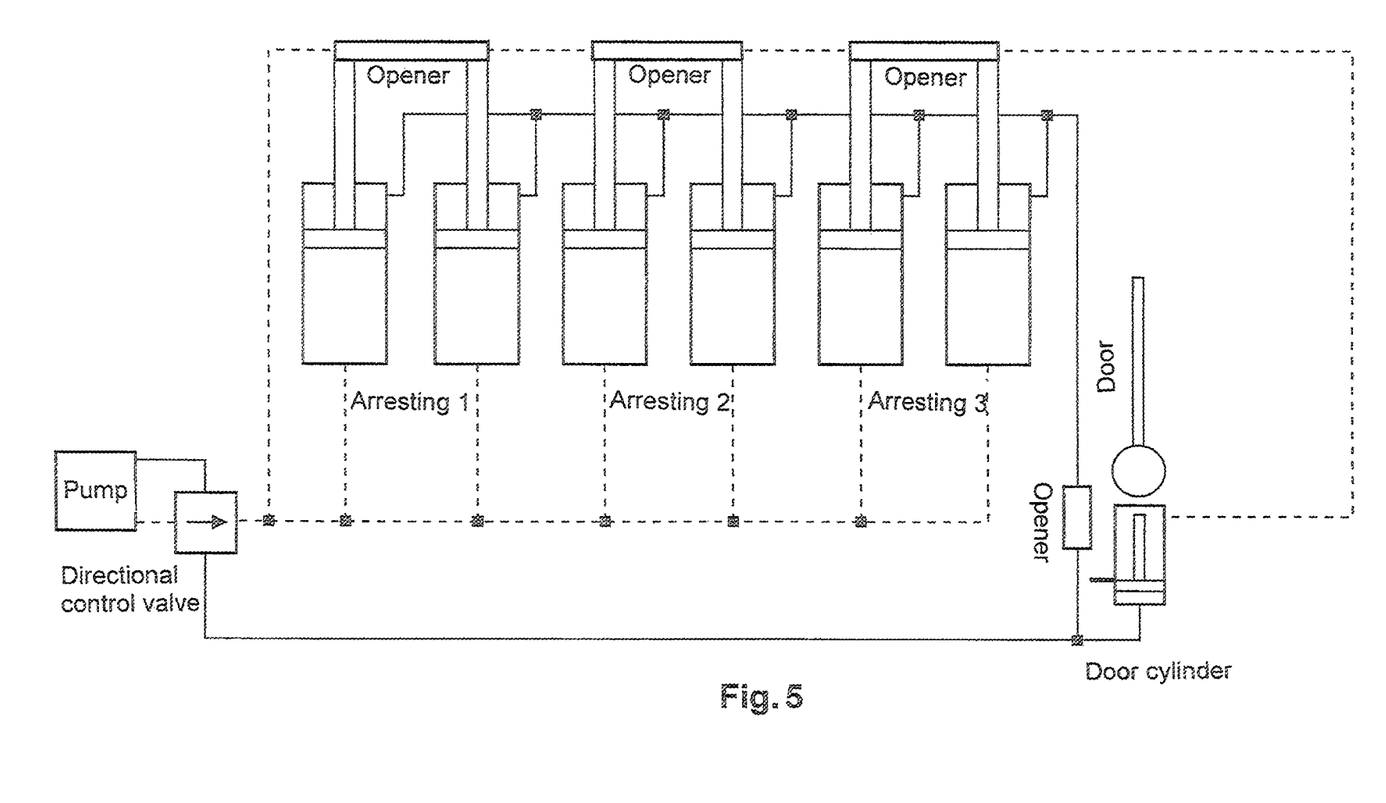

FIG. 5 shows the door 12 in an opened position and thus the service personnel can pass from the stationary part of the wind power installation into the front part which is the actually rotating part of the wind power installation but which has now been securely fixed, and can perform service operations there.

Figure 6:
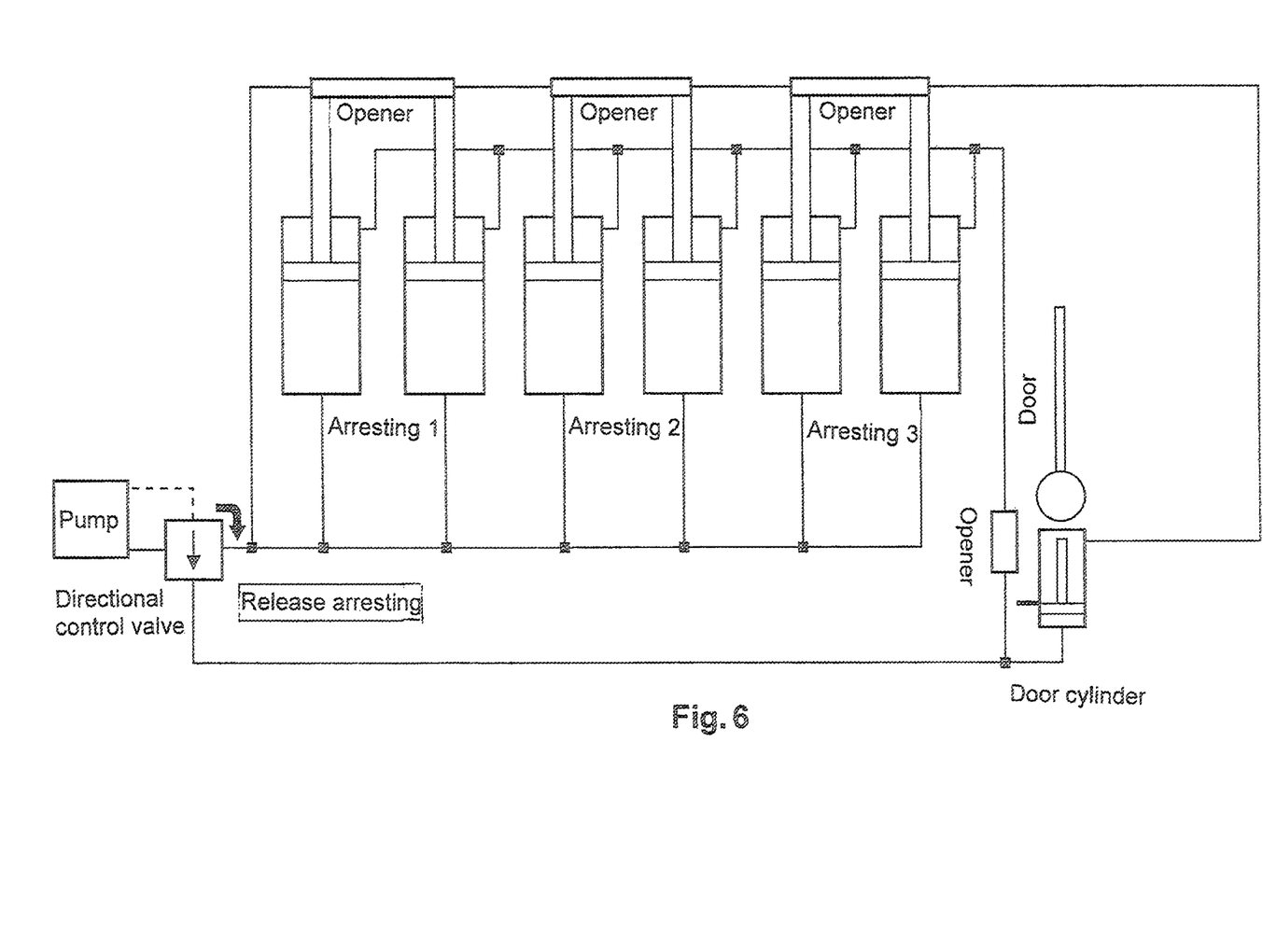

FIG. 6 now shows preparation for locking the door.

Figure 7:
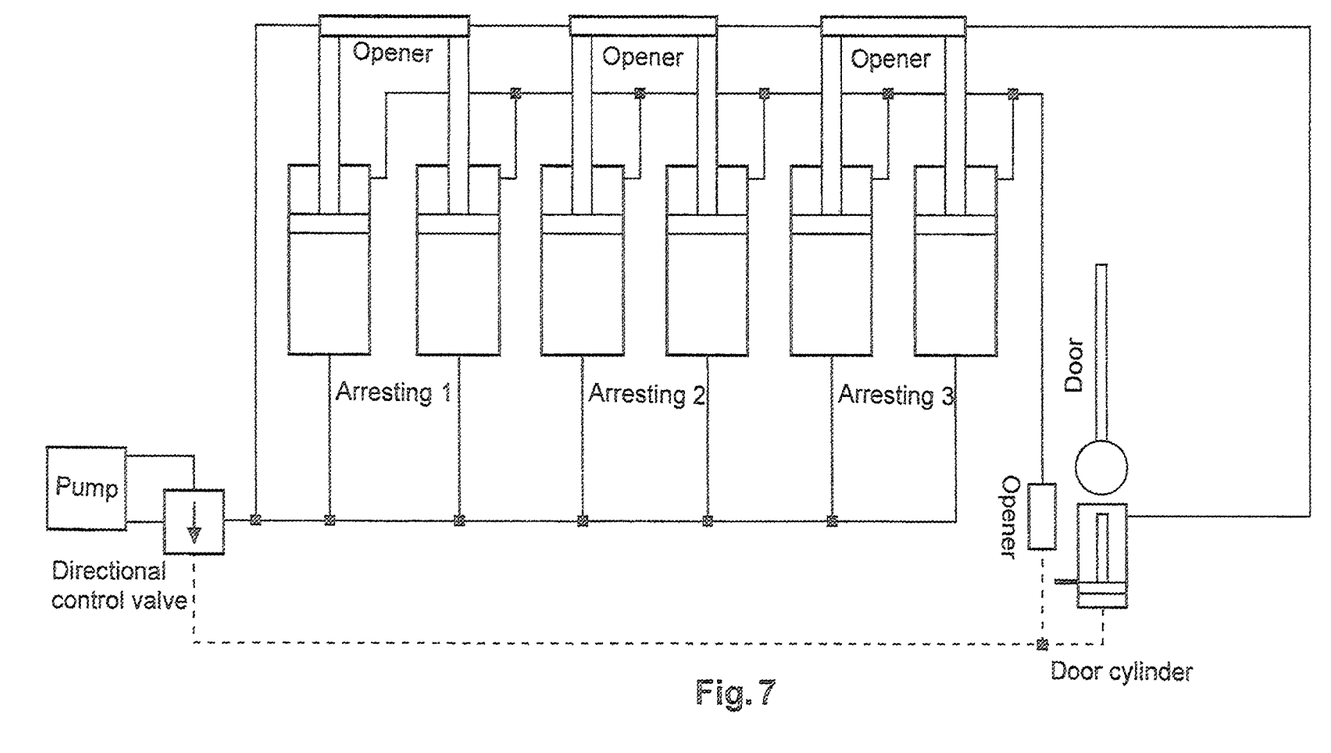

For that purpose firstly the directional control valve 2 is pivoted so that, when pumping is effected again, the piston is displaced in the cylinder for the door in the direction of its locking position. As long as the door is still open however—see FIG. 7—complete forward movement of the piston is however not possible. As can also be seen from the Figures (particularly FIG. 8) associated with the locking mechanism of the door there is also a valve 13 (opener) which however is closed as long as the piston has not assumed its predetermined position, namely has not moved into a locking position.

Figure 8:
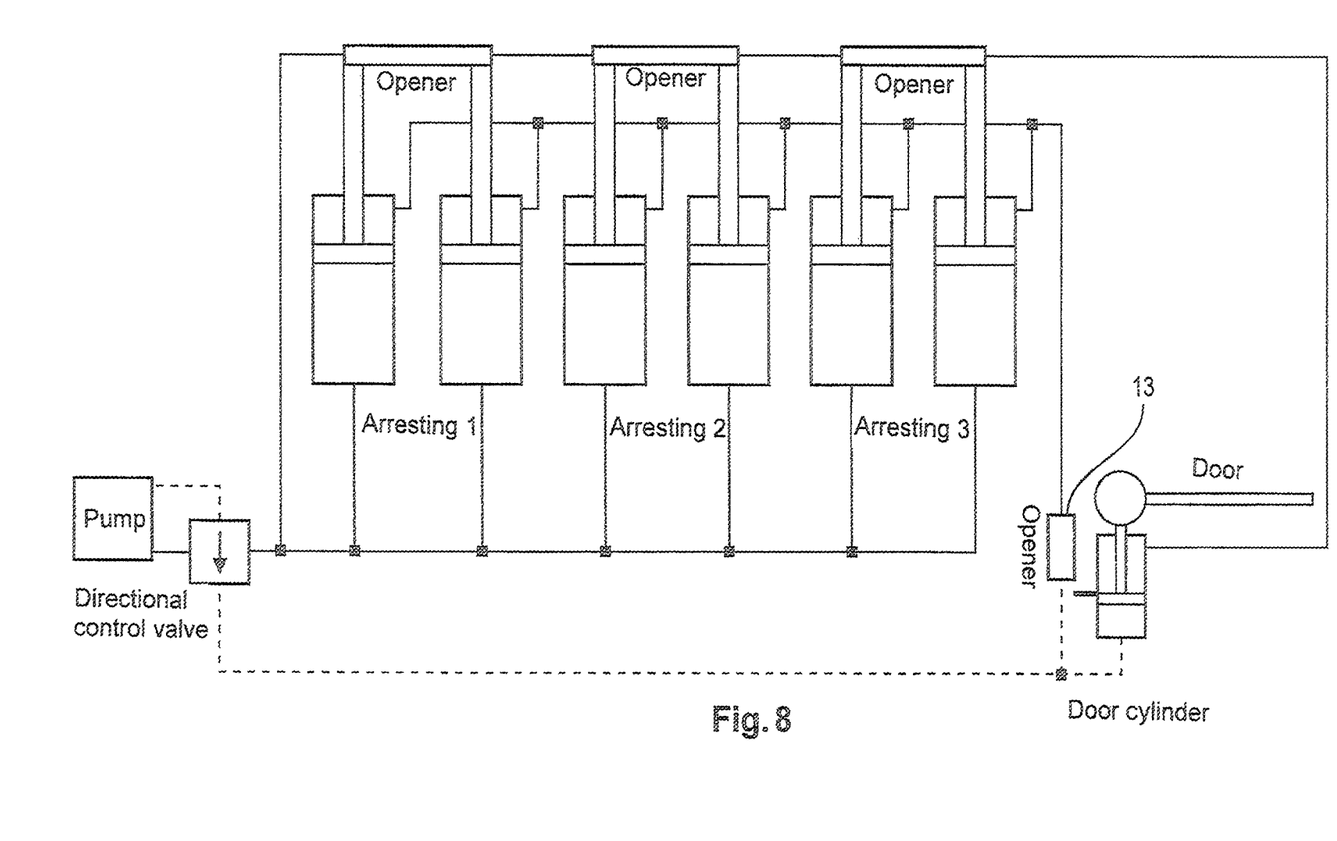
Figure 9:
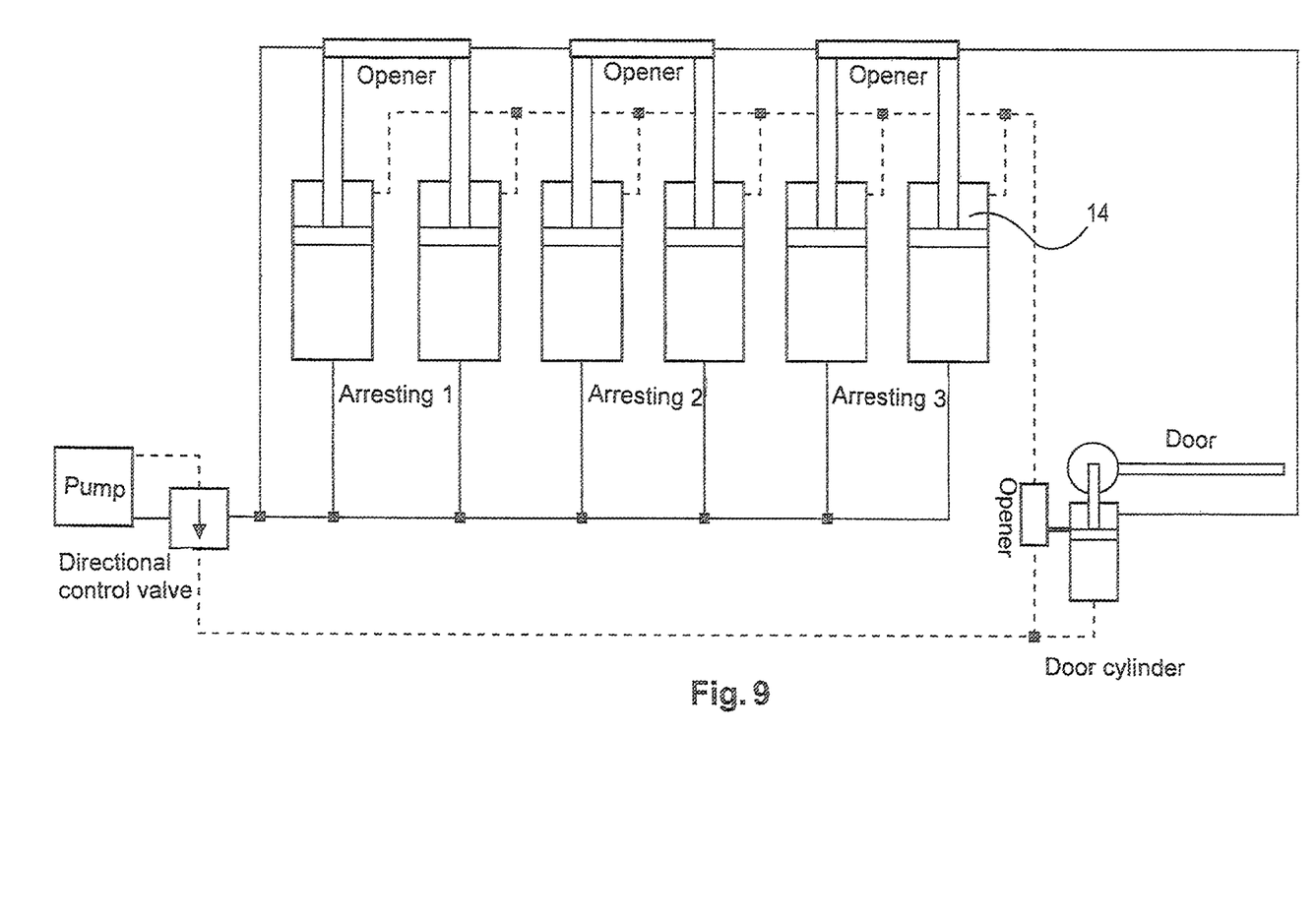
Figure 10:
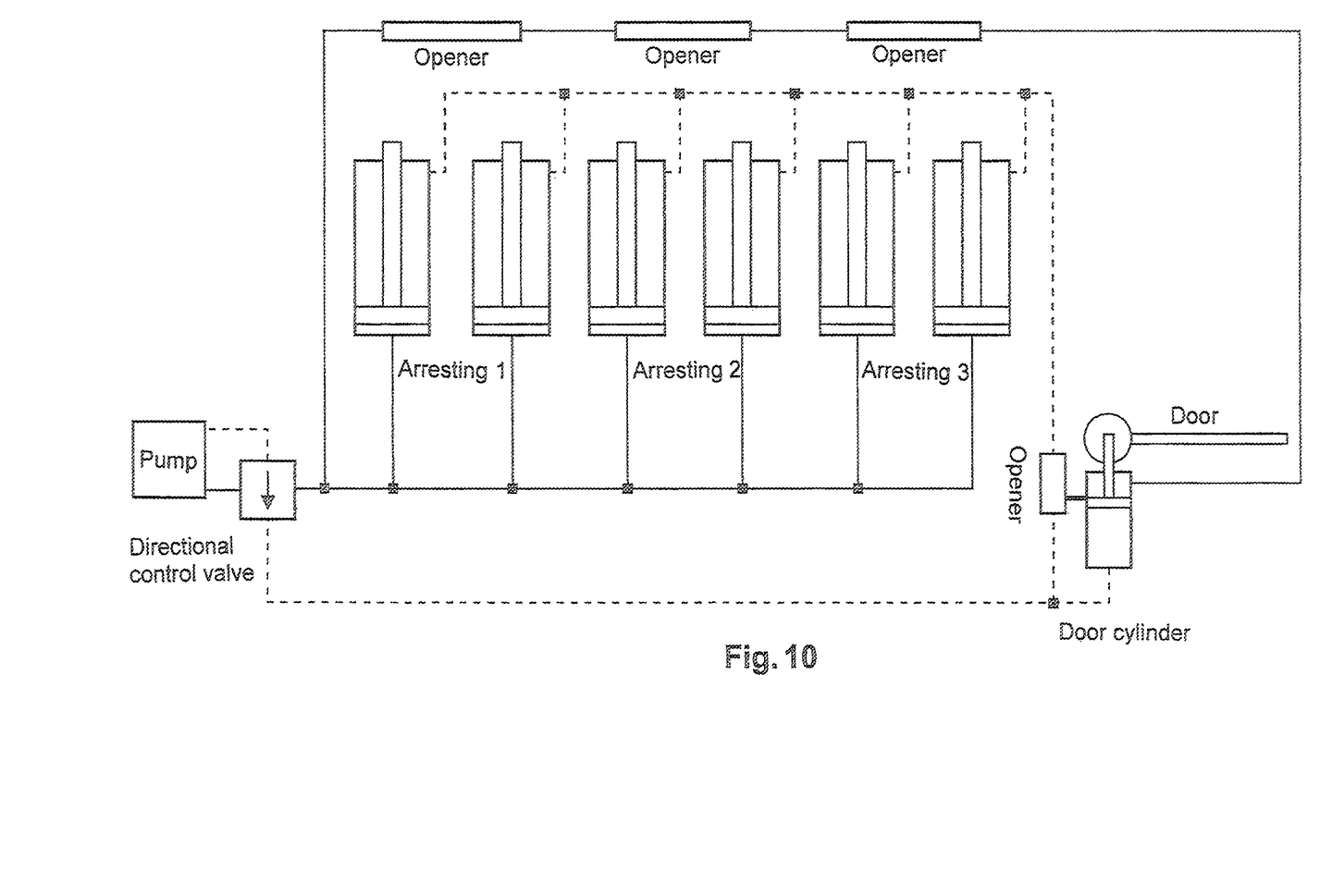

When now the door is closed—see FIG. 8—the piston can now be further displaced forwardly by the corresponding pressure of hydraulic fluid (the pressure is applied by the pump) and the door can be locked by the member passing through the rotary joint 17—see FIG. 9. When the piston 10 has then reached a given position, for example an end position, in the cylinder 9, the valve 13 associated with the door locking arrangement is opened and now hydraulic fluid can pass into the chambers 14 of the cylinders 5 of the arresting devices 3 and in that case push the pistons 4 back—see FIG. 10—so that the valves 7 (openers) are closed again.

Figure 11:
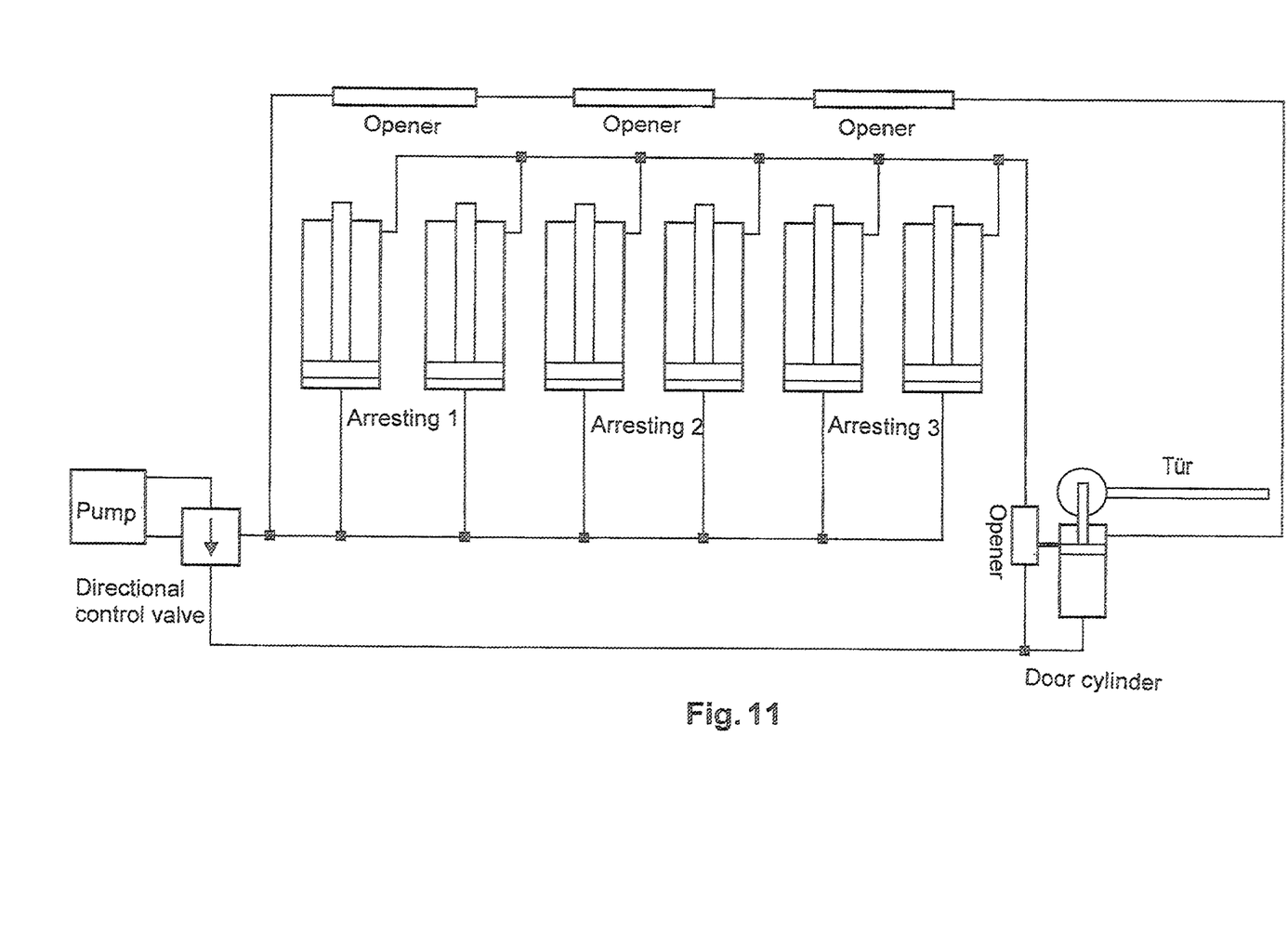

FIG. 11 shows that the system has assumed its initial position again. Now therefore the rotating part of the wind power installation is released, the rotor can rotate and the wind power installation can be set in operation and at the same time the door between the stationary and the rotating parts is securely and in particular mechanically locked and cannot be opened so that people cannot pass into the rotating part of the wind power installation.

It is also possible for the illustrated embodiment for the door locking arrangement to be of an electromechanical or purely electrical nature. Thus it is also possible for example for the arresting action for fixing the rotating part to be implemented by an electric motor or solenoid so that, when the fixing pins which are driven forward by the electric motor have reached their fixing position, an electromechanical closure is supplied with electric power and the door is released.

The advantage of the hydraulic system is that the pump can also be hand-driven and thus both fixing of the rotating part of the wind power installation and also opening of the door can be effected manually. That also means therefore that, in the situation where the network voltage has failed and thus electric power is no longer available, manual driving (hand driving) for opening purposes is however also always still available for closing the door.

The door between the rotating and the stationary parts of the wind power installation can close an opening (a so-called manhole) which is formed by an opening (for example 50-70 cm in diameter) of the stator being brought into aligning coincidence with a corresponding opening in the rotor of the generator.

Figure 12:
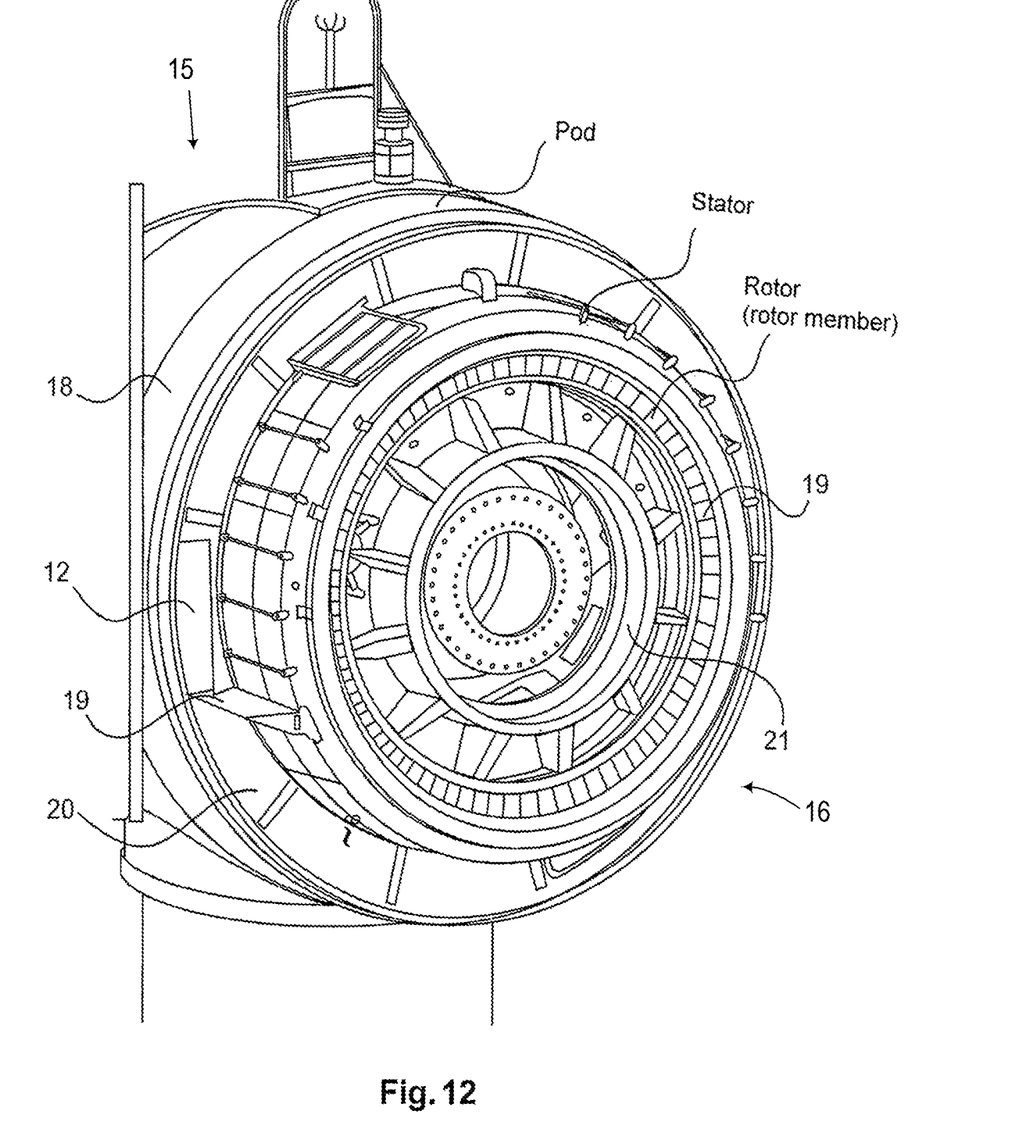
FIGS. 12-14 show the inside of a pod casing in accordance with an embodiment of the invention.
Figure 13:
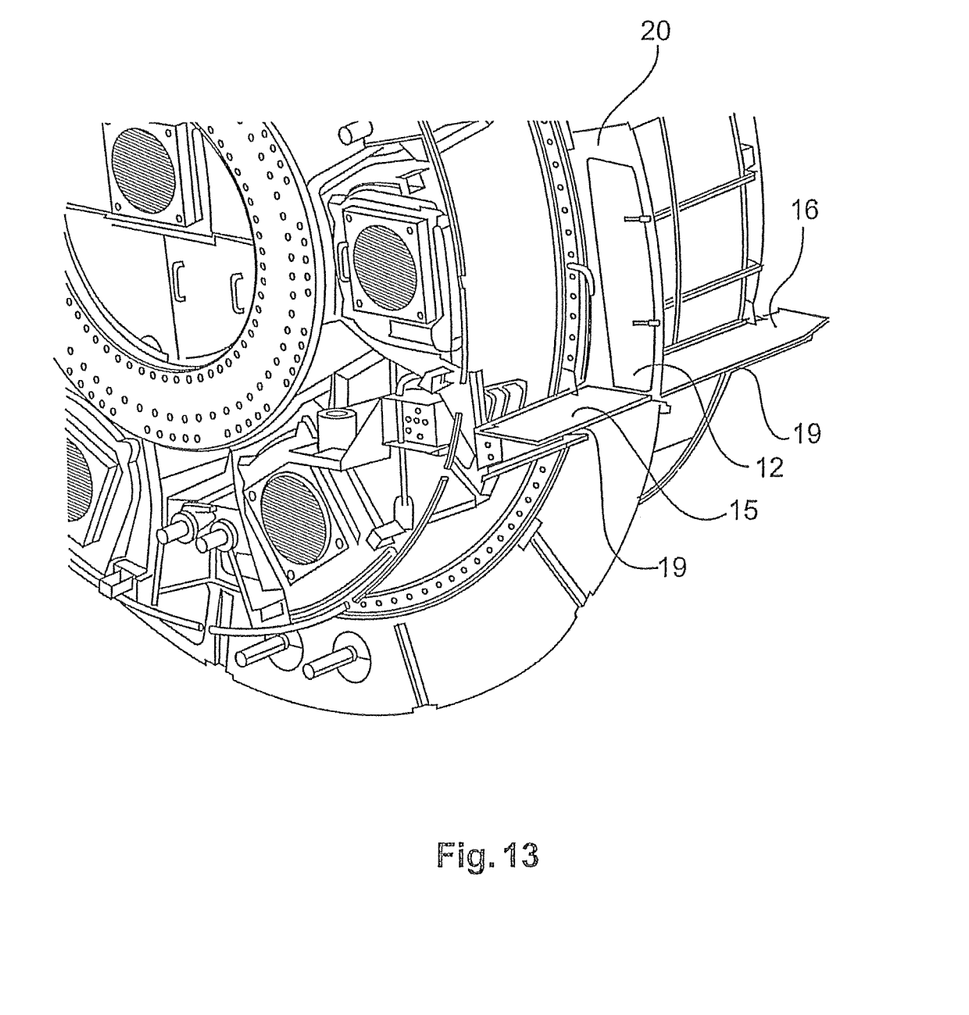
Figure 14:
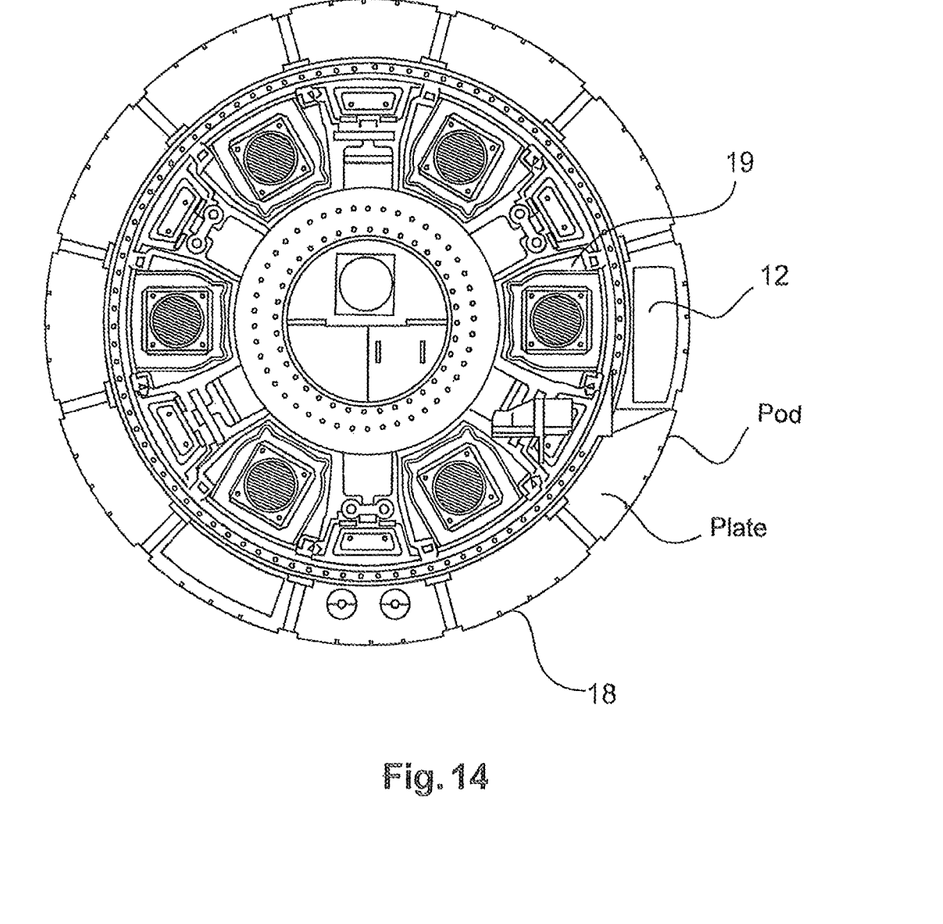

It is however also particularly advantageous—and this is an inventive aspect which is also entirely independent of the foregoing configurations—if the door (or the access) is within the pod casing 18 of the wind power installation and beside the generator, as indicated in FIGS. 12 to 14. For better illustration in this case the pod casing has been omitted in the front part of the image. In the illustrated Figure disposed beneath the door is a platform 19 which can be accessed by the maintenance personnel. The door itself is let within a wall 20, for example of sheet metal. In the illustrated example the part 15 is the part which is also associated with the stationary part of the machine housing or the pod of the wind power installation and, when the maintenance personnel opens the door 12 and passes into the part 16, the maintenance personnel is in the part in which the rotating parts of the wind power installation are disposed, that is to say the rotor, the hub and the rotor member 21 of the generator etc. The advantage of the structure shown in FIGS. 12 to 14 is that access from the stationary part of the wind power installation into the rotating part thereof is very simple and maintenance personnel no longer has to perform the laborious operation of first bringing an opening in the rotating part of the generator into aligned relationship with the stationary part and no longer has to pass therethrough.

In particular the maintenance personnel can also pass through the door 12 in an upright position and tools and the like can be transported more easily into the front part as the rotating part of the wind power installation. The rotating part of the wind power installation is also referred to as the spinner and is encased like the entire pod.

Figure 15:
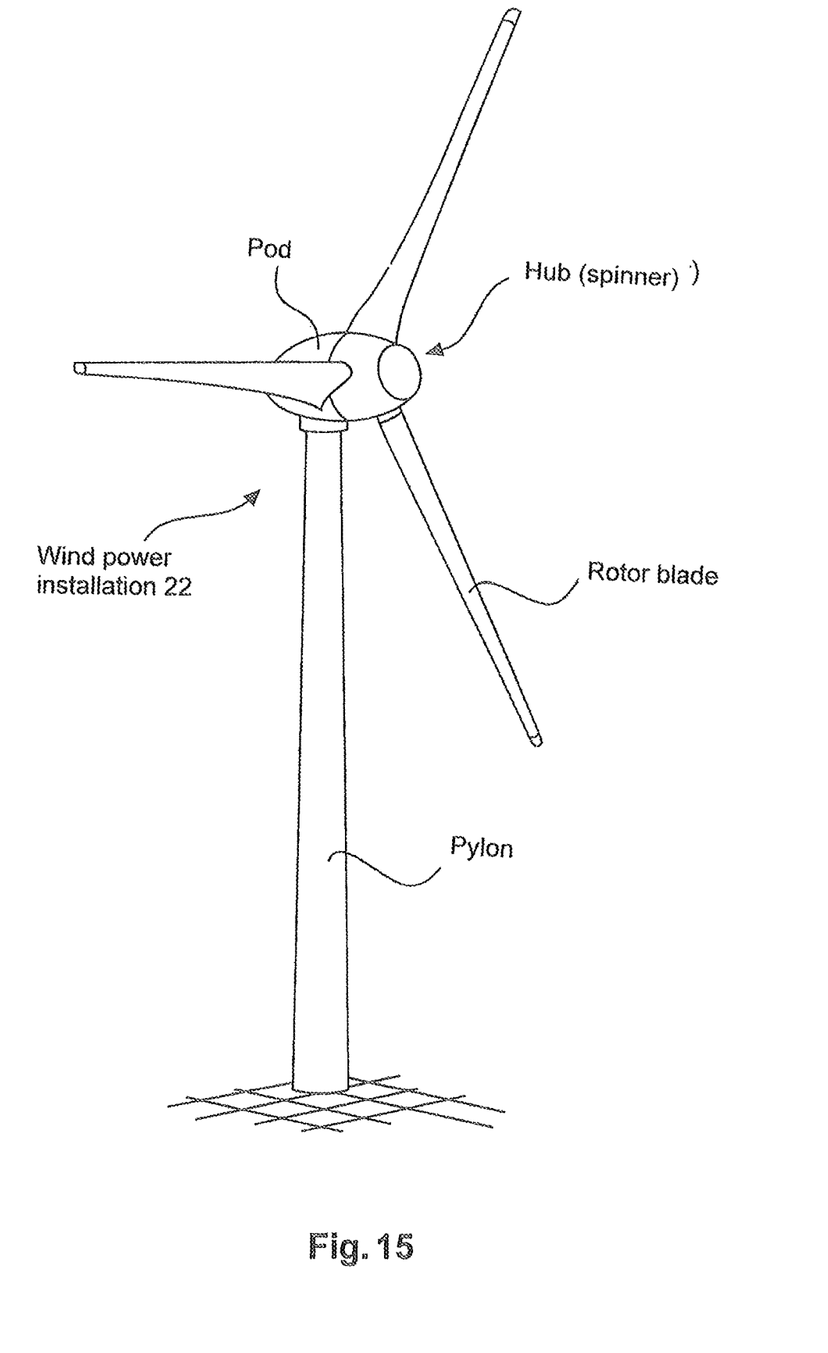
FIG. 15 shows a wind power installation in accordance with an embodiment of the invention.

FIG. 15 shows a view of a wind power installation.

Figure 16:
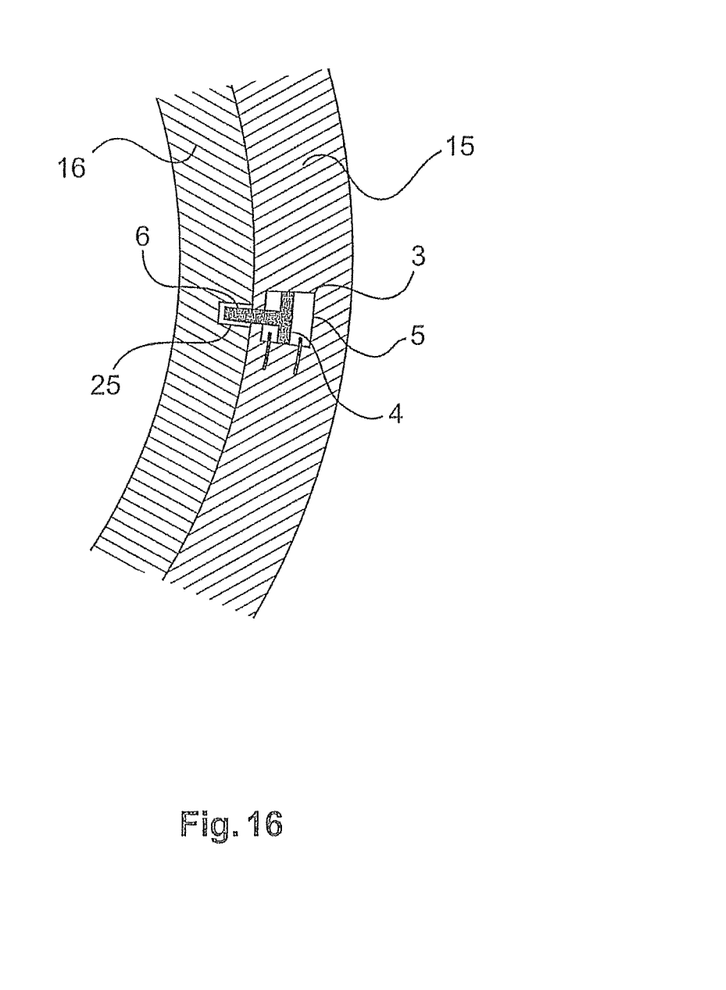
FIG. 16 shows a close-up of the locking device in accordance with an embodiment of the invention.

FIG. 16 shows a view in principle illustrating the rotating part 16 and the stationary part 15 of a wind power installation. As mentioned the rotating part of a wind power installation is the rotor or rotor member in relation to the generator and the stationary part 15 is the stator.

As illustrated the locking device is provided in the stationary part of the wind power installation and in that case the piston rod 6 of the piston 4 of the cylinder 5 can be advanced hydraulically into a bore 25 in the rotating part so that the rotating part is fixed.

The hydraulic lines in FIGS. 1 to 11, like also the pump of the directional control valve and also all valves, the door and the locking mechanism and the arresting means are arranged on the stationary part of the wind power installation.

In a simplified example the pump can be provided in the form of a piston pump. In that case the piston divides the pump into two regions and when for example the piston—see FIG. 1—of the pump 1 moves downwardly (↓) the hydraulic fluid is urged through the lower outlet (shown in broken line in FIG. 2) of the pump while at the same time hydraulic fluid flowing back out of the system can flow into the upper region of the pump through the upper intake (the solid line in FIG. 2).

The situation is different if the direction of movement of the piston is reversed (↑). The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for locking and unlocking a door that is arranged between a stationary part and a rotating part of a wind power installation, the apparatus comprising:
   arresting means for fixing or arresting the rotating part; and
   locking means located between the rotating part and the stationary part of the wind power installation for locking and unlocking the door, the door being configured to unlock when the arresting means has fixed or stopped the rotating part of the wind power installation.

2. The apparatus according to claim 1 wherein the arresting means is arranged on the stationary part of the wind power installation and includes one or more bars that are each displaceable by a particular distance in order to come into engagement with a corresponding opening arranged on the rotating part of the wind power installation thereby mechanically fixing the rotating part of the wind power installation.

3. The apparatus according to claim 2 wherein a hydraulic system is configured to drive the arresting means and in response to the arresting means moving to a particular position, a valve or a switching device is opened to pass hydraulic fluid to the locking means for unlocking the door.

4. The apparatus according to claim 1 wherein the locking means for the door is coupled to a valve that is closed when the door is unlocked and is opened when the locking means for the door assumes a particular position, and wherein after opening the valve, the arresting means for the rotating part of the wind power installation is moved to a starting position to release the fixing of the rotating part.

5. A method of unlocking a door between a stationary part and a rotating part of a wind power installation, the method comprising:
   stopping a rotation of the rotating part by moving arresting devices from a first location on the stationary part to a second location in an opening of the rotating part; and
   in response to the rotating part stopping, moving a rod out of an opening of a part of the door thereby allowing the opening of the door.

6. The method according to claim 5 further comprising moving the rod into the opening of the part of the door when the door is closed and locked.

7. A wind power installation comprising:
   a pylon;
   a generator that includes a stator and a rotor,
   a pod secured to the pylon, the pod housing a stationary part and a rotating part that includes the rotor of the generator, an aerodynamic rotor, and a hub, wherein the stator of the generator is coupled to the stationary part;
   an opening that provides access from the stationary part of the pod to the rotating part of the pod;
   a door covering the opening; and
   wherein the rotor member of the generator is located in the rotating part of the pod and is accessible from the stationary part of the pod, and
   wherein the door and the opening are within the pod but laterally spaced beside the generator.

8. The wind power installation according to claim 7 wherein the door is secured to the stationary part.

9. The wind power installation according to claim 7 wherein the door remains locked until the rotating part stops rotating.

10. An apparatus for unlocking a door located between a stationary part and a rotating part of a wind power installation, the apparatus comprising:
   an arresting device configured to stop movement of the rotating part of the wind power installation;
   an engagement device having an opening located on the door; and
   a rod configured to move in and out of the opening of the engagement device, when the rod is moved out of the opening of the engagement device the door is unlocked, the rod being configured to move out of the opening in response to receiving an indication that the arresting device has stopped the movement of the rotating part.

11. The apparatus according to claim 10 wherein arresting device includes a plurality of pistons located on the stationary part that each extend into a corresponding opening on the rotating part to stop movement of the rotating part.

12. The apparatus according to claim 11 wherein the plurality of pistons are moved by hydraulic fluid.

13. The apparatus according to claim 10 wherein when the rotating part stops moving, hydraulic fluid causes the rod to move out of the opening of the door thereby unlocking the door.

14. The method of claim 5 wherein moving the rod out of the opening of the part of the door comprises opening a valve that allows fluid to flow therethrough and that causes the rod to move out of the opening of the part of the door.

\* \* \* \* \*